United States Patent [19]

Suzuki

[11] Patent Number: 5,378,897

[45] Date of Patent: Jan. 3, 1995

[54] RADIATION IMAGE STORAGE PANEL

[75] Inventor: Hideki Suzuki, Kanagawa, Japan

[73] Assignee: Fuji Photo Film Co., Ltd., Kanagawa, Japan

[21] Appl. No.: 164,444

[22] Filed: Dec. 9, 1993

[30] Foreign Application Priority Data

Dec. 9, 1992 [JP] Japan .................. 4-352098

[51] Int. Cl.⁶ .............................. G21K 4/00
[52] U.S. Cl. ................. 250/484.4; 250/487.1
[58] Field of Search ............ 290/484.4, 486.1, 487.1, 290/488.1, 484.2, 484.3, 367; 178/182, 185, 44

[56] References Cited

U.S. PATENT DOCUMENTS 4,368,390  1/1983  Arakawa et al. ............ 250/484.4
4,950,559  8/1990  Takahashi et al. ............ 250/486.1

Primary Examiner—Paul M. Dzierzynski
Assistant Examiner—Richard Hanig
Attorney, Agent, or Firm—Sixbey, Friedman, Leedom & Ferguson

[57] ABSTRACT

Disclosed is an improved radiation image storage panel having a stimulable phosphor layer and a reflecting-material layer. The stimulable phosphor layer contains a stimulable divalent europium activated barium fluorohalide phosphor, and the reflecting-material layer contains metal oxide which emits secondary X-rays having energy of 38–60 KeV. Also disclosed is a radiation image storage panel in which such metal oxide is contained in the above stimulable phosphor layer.

6 Claims, 1 Drawing Sheet

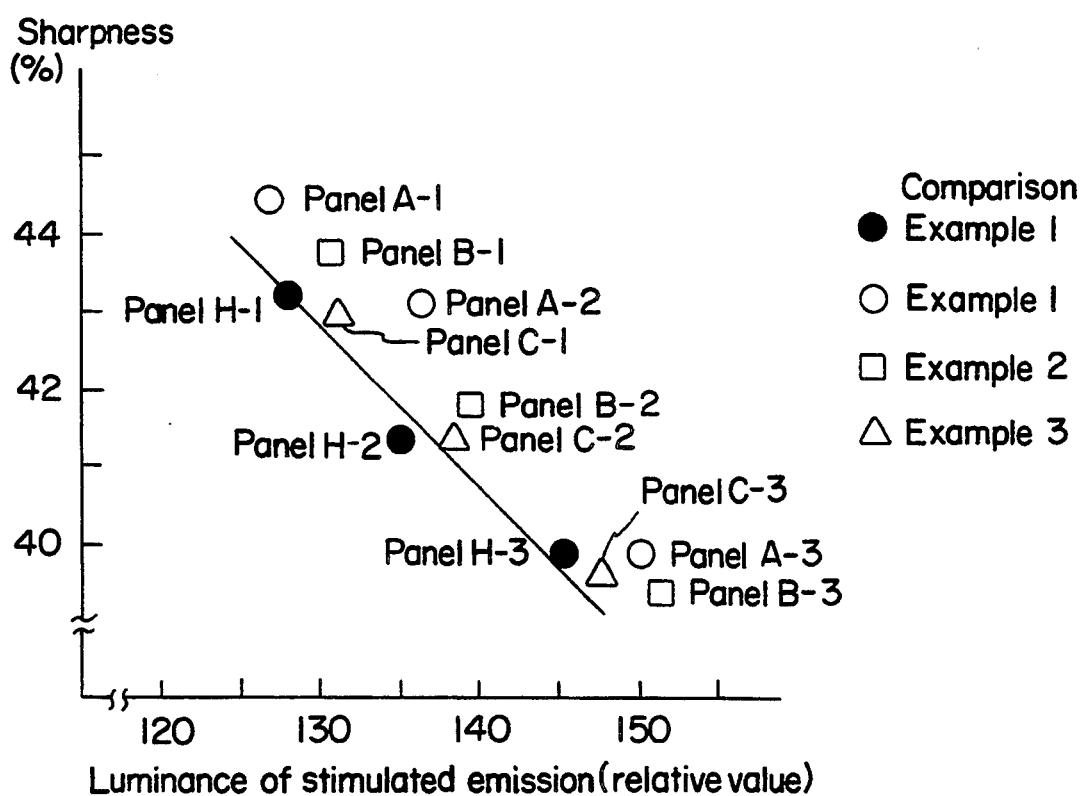

RADIATION IMAGE STORAGE PANEL

FIELD OF THE INVENTION

The present invention relates to an improvement of a radiation image storage panel which has a stimulable phosphor layer containing stimulable divalent europium activated barium fluorohalide phosphor and a reflecting-material layer on the phosphor layer.

BACKGROUND OF THE INVENTION

As a method replacing a conventional radiography, a radiation image recording and reproducing method utilizing a stimulable phosphor is known. In the method, a radiation image storage panel containing a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at a considerably smaller dose, as compared with the conventional radiography. Therefore, the method is especially useful for direct radiography such as X-ray radiography for medical diagnosis.

The radiation image storage panel to be employed in the above-described method generally comprises a support and a stimulable phosphor layer provided on one surface of the support. However, if the phosphor layer is self-supporting, the support may be omitted.

As the stimulable phosphor layer, there are known not only a phosphor layer comprising a binder and a stimulable phosphor dispersed therein but also a phosphor layer composed of an agglomerate of a stimulable phosphor, containing no binder, which is formed by a deposition process or a firing process. In any of the above-described phosphor layers, the stimulable phosphor emits light (stimulated emission) when excited with stimulating rays such as visible light or infrared rays, after having been exposed to a radiation such as X-rays. Accordingly, the radiation having passed through an object or radiated from an object is absorbed by the phosphor layer of the panel in an amount proportional to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

The radiation image recording and reproducing method is very useful for obtaining a radiation image as a visible image as described hereinbefore, and it is desired for the radiation image storage panel to be employed in the method to have a high sensitivity and provide an image of high quality (high sharpness, high graininess, etc.).

For enhancing the sensitivity of the radiation image storage panel, it is known that a light-reflecting layer is provided between the support and the stimulable phosphor layer by applying a coating dispersion comprising a binder and white pigment over the support. For example, a radiation image storage panel having a light-reflecting layer comprising a white pigment is disclosed in Japanese Patent Provisional Publication No. 56(1981)-12600. In the publication, titanium dioxide, white lead, zinc sulfide, aluminum oxide and magnesium oxide are described as examples of the white pigments.

As a stimulable phosphor to be preferably employed for a radiation image storage panel, a divalent europium activated alkaline earth metal (especially, barium) fluorohalide phosphor has been proposed because it gives stimulated emission of high luminance. The spectrum of the stimulated emission of this phosphor ranges from near UV region to blue region. In the spectrum, emission intensity in near UV region is stronger than that in visible region, and the peak of the spectrum is located around 390 nm.

In the case that a stimulable phosphor which emits stimulated emission in both UV region and visible region (e.g., above-mentioned divalent europium activated alkaline earth metal fluorohalide phosphor) is employed for a radiation image storage panel, the sensitivity of such panel can not be satisfactorily enhanced by the provision of a light-reflecting layer comprising white pigments exemplified in the Japanese Patent Provisional Publication No. 56(1981)-12600 except magnesium oxide between the support and the stimulable phosphor layer. This is because such white pigments have a considerably low reflectivity in near UV region while shows high reflectivity for the light in visible region. Therefore, the light-reflecting layer comprising such white pigments does not have sufficient reflectivity.

In order to improve a light-reflecting layer comprising white pigment, some studies concerning white pigment materials have been reported. One of such studies is disclosed in Japanese Patent Provisional Publication No. 59(1984)-162500, in which an alkaline earth metal fluorohalide represented by $M^{II}FX$ (wherein $M^{II}$ is at least one metal selected from the group consisting of Ga, Sr and Ca; X is at least one halogen selected from the group consisting of Cl and Br) is employed as white pigment.

SUMMARY OF THE INVENTION

The object of the present invention is to provide a new radiation image storage panel which gives enhanced sharpness on condition that the sensitivity is kept at the same level and which gives enhanced sensitivity on condition that the sharpness is kept at the same level.

The invention resides in a radiation image storage panel having a reflecting-material layer which contains a white pigment and which is provided on one surface of a stimulable phosphor layer containing stimulable divalent europium activated barium fluorohalide phosphor; wherein said white pigment is a metal oxide which emits secondary X-rays having an energy in the range of 38 to 60 KeV.

The invention also resides in a radiation image storage panel having a stimulable phosphor layer which contains both the stimulable divalent europium activated barium fluorohalide phosphor and a white pigment of metal oxide which emits secondary X-rays having an energy in the range of 38 to 60 KeV.

The radiation image storage panel of the invention is more sensitive, at the same sharpness level, than the known radiation image storage panel having a light-reflecting layer. This means that the radiation image storage panel of the invention gives improved sharpness as compared with the known radiation image storage panel having a light-reflecting layer at the same sensitivity level.

BRIEF DESCRIPTION OF DRAWINGS

FIG. 1 shows experimental results concerning relation between the luminance of stimulated emission and the sharpness of the radiation image storage panels of Examples.

DETAILED DESCRIPTION OF THE INVENTION

The above-described divalent europium activated barium fluorohalide phosphor has the formula: BaFX:$Eu^{2+}$ (wherein X is at least one halogen selected from the group consisting of Cl, Br and I). In the present invention, additives may be added to the phosphor, and a portion of Ba of the formula may be substituted with other alkaline metals such as Ca and Sr, provided that the characteristics of the phosphor converning the X-ray absorption and stimulated emission are essentially kept.

In the radiation image storage panel of the invention, the metal oxide emitting secondary X-rays of energy in the range of 38 to 60 KeV is contained in the reflecting-material layer or the stimulable phosphor layer as white pigment. Such metal oxide absorbs X-rays having been generated and passed through an object, and the immediately emits secondary X-rays of energy in the range of 38 to 60 KeV. The emitted secondary X-rays are easily absorbed by Ba atom in the divalent europium activated barium fluorohalide phosphor, since the K-absorption edge of Ba atom is located at 37.4 KeV. Consequently, such oxide increases the total amount of X-ray energy absorbed by the stimulable phosphor to enhance the sensitivity of the radiation image storage panel. Since the radiation image storage panel of the invention has high sensitivity, the thickness of the phosphor layer can be made relatively thin, on condition that the sensitivity is kept at the same level, to improve the sharpness of the obtainable image.

Therefore, the radiation image storage panel of the invention has high sensitivity and it can give a radiation image (X-ray image) of improved sharpness without increasing the applied radiation dose.

Further, the white pigment employed in the invention effectively reflects stimulating rays.

In the case that the radiation image storage panel of the invention is provided with the reflecting-material layer, the reflecting-material layer may be simply arranged on one surface of the stimulable phosphor layer or it may be arranged between the support and the phosphor layer. Further, the above-mentioned metal oxide may be incorporated into the support so that the support can work as the reflecting-material layer.

A typical radiation image storage panel of the invention comprises a support, a reflecting-material layer and a stimulable phosphor layer. Therefore, referring to such radiation image storage panel, a process for the preparation of the radiation image storage panel of the invention is described below.

A support material employable in the invention can be selected from those employed in the known radiation image storage panels. Examples of the support material include plastic films such as films of cellulose acetate, polyester, polyethylene terephthalate, polyamide, polyimide, triacetate and polycarbonate; ordinary papers; baryta paper; resin-coated papers; pigment papers containing titanium dioxide or the like; and papers sized with polyvinyl alcohol or the like. Plastic films are particularly preferred for the invention in view of characteristics and performance as a recording medium.

An adhesive layer may be provided by coating a polymer material such as gelatin over the surface of the support on the phosphor layer side, so as to enhance the adhesion between the support and the phosphor layer.

A reflecting-material layer, which is a characteristic element of the invention, comprises a binder and metal oxide emitting secondary X-rays of energy in the range of 38 to 60 KeV dispersed therein.

Examples of the metal oxides which can emit secondary X-rays of energy in the range of 38 to 60 KeV include oxides of Sm, Eu, Gd, Tb, Dy, Ho, Er, Tm, Yb, Lu, Hf, and Ta. Energies of K-absorption edge and secondary X-rays ($K\alpha$ lines: $K\alpha_1$ and $K\alpha_2$) of the above metal elements are set forth in the following table.

| Element | K-absorption edge/KeV | $K\alpha_1$/KeV | $K\alpha_2$/KeV |
| --- | --- | --- | --- |
| Sm | 46.8 | 40.1 | 39.5 |
| Eu | 48.4 | 41.4 | 40.7 |
| Gd | 50.2 | 43.0 | 42.3 |
| Tb | 52.0 | 44.4 | 43.6 |
| Dy | 53.6 | 45.8 | 45.0 |
| Ho | 55.5 | 47.4 | 46.5 |
| Er | 57.3 | 48.9 | 48.0 |
| Tm | 59.2 | 50.7 | 49.5 |
| Yb | 61.3 | 52.3 | 51.4 |
| Lu | 63.2 | 54.0 | 52.9 |
| Hf | 65.2 | 55.8 | 54.5 |
| Ta | 67.4 | 57.6 | 56.3 |

The term "secondary X-rays" in the invention means at least one of $K\alpha_1$ and $K\alpha_2$ lines. In other words, the metal oxide at least one of whose $K\alpha_1$ and $K\alpha_2$ lines is located in the range of 38–60 KeV can be employed for the invention as the white pigment. The metal oxides to be preferably used for the invention are oxides of Sm, Eu and Gd, each of which emits secondary X-rays of energy in the range of 38 to 45 KeV.

It is also preferred that the mean grain size of the white pigment of the metal oxide which can emit the secondary X-ray of energy of 38–60 KeV be smaller than that of the stimulable phosphor particles.

A binder and a solvent employable for preparing the reflecting-material layer can be selected from those employed for preparing the stimulable phosphor layer stated hereinafter. A ratio between the binder and the white pigment in the coating dispersion is generally in the range of 1:1 to 1:50 (by weight). It is preferred to use a relatively small amount of binder in view of reflecting character of the obtained layer, but considering practical preparation of the layer, the ratio preferably is in the range of 1:2 to 1:20 (by weight). The thickness of the reflecting-material layer preferably is in the range of 5 to 100 μm.

The stimulable phosphor layer is provided on the reflecting-material layer. A typical stimulable phosphor layer comprises a binder and a stimulable phosphor dispersed therein.

Examples of the stimulable divalent europium activated barium fluorohalide phosphor, which is employed for the radiation image storage panel of the invention, include:

$(Ba_{1-x-y},Mg_x,Ca_y)FX:aEu^{2+}$, in which X is at least one halogen selected from the group consisting of Cl and Br, "x" and "y" are numbers satisfying the conditions of $0<x+y\leq 0.6$ and $xy\neq 0$, and "a" is a number satisfying the condition of $1\times 10^{-6}\leq a\leq 5\times 10^{-2}$, as described in Japanese Patent Provisional Publication No. 55(1980)-12143;

$(Ba_{1-x},M^{II}_x)FX:yEu$, in which $M^{II}$ is at least one divalent metal selected from the group consisting of Mg, Ca, Sr, Zn and Cd, X is at least one halogen selected from the group consisting of Cl, Br and I, "x" is a number satisfying the condition of $0\leq x\leq 0.6$ and "y" is a number satisfying the condition of $0\leq y\leq 0.2$, as described in Japanese Patent Provisional Publication No. 55(1980)-12145;

$M^{II}FX\cdot xA:yEu$, in which $M^{II}$ is at least one element selected from the group consisting of Ba, Ca, Sr, Mg, Zn and Cd, A is at least one element selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $GeO_2$, $SnO_2$, $Nb_2O_5$, $Ta_2O_5$ and $ThO_2$, X is at least one halogen selected from the group consisting of Cl, Br and I, and "x" and "y" are numbers satisfying the conditions of $5\times 10^{-5}\leq x\leq 0.5$ and $0<y\leq 0.2$, respectively, as described in Japanese Patent Provisional Publication No. 55(1980)-160078;

$(Ba_{1-x},M^{II}_x)F_2\cdot aBaX_2:yEu,zA$, in which $M^{II}$ is at least one divalent metal selected from the group consisting of Be, Mg, Ca, Sr, Zn and Cd, X is at least one halogen selected from the group consisting of Cl, Br and I, A is at least one element selected from the group consisting of Zr and Sc, and "a", "x", "y" and "z" are numbers satisfying the conditions of $0.5\leq a\leq 1.25$, $0\leq x\leq 1$, $1\times 10^{-6}\leq y\leq 2\times 10^{-1}$ and $0<z\leq 1\times 10^{-2}$, respectively, as described in Japanese Patent Provisional Publication No. 56(1981)-116777;

$(Ba_{1-x},M^{II}_x)F_2\cdot aBaX_2:yEu,zB$, in which $M^{II}$ is at least one divalent metal selected from the group consisting of Be, Mg, Ca, Sr, Zn and Cd, X is at least one halogen selected from the group consisting of Cl, Br and I, and "a", "x", "y" and "z" are numbers satisfying the conditions of $0.5\leq a\leq 1.25$, $0\leq x\leq 1$, $1\times 10^{-6}\leq y\leq 2\times 10^{-1}$ and $0<z\leq 2\times 10^{-1}$, as described in Japanese Patent Provisional Publication No. 57(1982)-23673;

$(Ba_{1-x},M^{II}_x)F_2\cdot aBaX_2:yEu,zA$, in which $M^{II}$ is at least one divalent metal selected from the group consisting of Be, Mg, Ca, Sr, Zn and Cd, X is at least one halogen selected from the group consisting of Cl, Br and I, A is at least one element selected from the group consisting of As and Si, and "a", "x", "y" and "z" are numbers satisfying the conditions of $0.5\leq a\leq 1.25$, $0\leq x\leq 1$, $1\times 10^{-6}\leq y\leq 2\times 10^{-1}$ and $0<z\leq 5\times 10^{-1}$, respectively, as described in Japanese Patent Provisional Publication No. 57(1982)-23675;

$Ba_{1-x}M_{x/2}L_{x/2}FX:yEu^{2+}$, in which M is at least one alkali metal selected from the group consisting of Li, Na, K, Rb and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl, X is at least one halogen selected from the group consisting of Cl, Br and I, and "x" and "y" are numbers satisfying the conditions of $1\times 10^{-2}\leq x\leq 0.5$ and $0\leq y\leq 0.1$, respectively, as described in Japanese Patent Provisional Publication No. 58(1983)-206678;

$BaFX\cdot xA:yEu^{2+}$, in which X is at least one halogen selected from the group consisting of Cl, Br and I, A is at least one fired product of a tetrafluoroboric acid compound and "x" and "y" are numbers satisfying the conditions of $1\times 10^{-6}\leq x\leq 0.1$ and $0<y\leq 0.1$, respectively, as stated in Japanese Patent Provisional Publication No. 59(1984)-27980;

$BaFX\cdot xA:yEu^{2+}$, in which X is at least one halogen selected from the group consisting of Cl, Br and I, A is at least one fired product of a hexafluoro compound selected from the group consisting of monovalent and divalent metal salts of hexafluoro silicic acid, hexafluoro titanic acid and hexafluoro zirconic acid, and "x" and "y" are numbers satisfying the conditions of $1\times 10^{-6}\leq x\leq 0.1$ and $0<y\leq 0.1$, respectively, as described in Japanese Patent Provisional Publication No. 59(1984)-47289;

$BaFX\cdot xNaX':aEu^{2+}$, in which each of X and X' is at least one halogen selected from the group consisting of Cl, Br and I, A is at least one element selected from the group consisting of As and Si, and "x" and "a" are number satisfying the conditions of $0<x\leq 2$ and $0<a\leq 0.2$, respectively, as described in Japanese Patent Provisional Publication No. 59(1984)-56479;

$M^{II}FX\cdot xNaX':yEu^{2+}:zA$, in which $M^{II}$ is at least one alkaline earth metal selected from the group consisting of Ba, Sr and Ca, each of X and X' is at least one halogen selected from the group consisting of Cl, Br and I, A is at least one element selected from the group consisting of V, Cr, Mn, Fe, Co and Ni, and "x", "y" and "z" are numbers satisfying the conditions of $0<x\leq 2$, $0<y\leq 0.2$ and $0<z\leq 1\times 10^{-2}$, respectively, as described in Japanese Patent Provisional Publication No. 59(1984)-56480;

$M^{II}Fx\cdot aM^{I}X'\cdot bM'^{II}X''_2\cdot cM^{III}X'''_3\cdot xA:yEu^{2+}:zA$, in which $M^{II}$ is at least one alkaline earth metal selected from the group consisting of Ba, Sr and Ca, $M^{I}$ is at least one alkali metal selected from the group consisting of Na, K, Rb and Cs, $M'^{II}$ is at least one divalent metal selected from the group consisting of Be and Mg, $M^{III}$ is at least one trivalent metal selected from the group consisting of Al, Ga, In and Tl, A is a metal oxide, X is at least one halogen selected from the group consisting of Cl, Br and I, X', X'' and X''' each are at least one halogen selected from the group consisting of F, Cl, Br and I, and "a", "b" and "c" are numbers satisfying the conditions of $0\leq a\leq 2$, $0<b\leq 1\times 10^{-2}$, $0\leq c\leq 1\times 10^{-2}$ and $a+b+c\geq 1\times 10^{-6}$, and "x" and "y" are numbers satisfying the conditions of $0<x\leq 0.5$ and $0<y\leq 0.2$, respectively, as described in Japanese Patent Provisional Publication No. 59(1984)-75200;

$M^{II}X_2\cdot aM^{II}X'_2:xEu^{2+}$, in which $M^{II}$ is at least one alkaline earth metal selected from the group consisting of Ba, Sr and Ca, X and X' each are at least one halogen selected from the group consisting of Cl, Br and I and are halogens satisfying the condition of $X\neq X'$, and "a" and "x" are numbers satisfying the conditions of $0.1\leq a\leq 10$ and $0<x\leq 2$, respectively, as described in Japanese Patent Provisional Publication No. 60(1985)-84581;

$M^{II}FX\cdot aM^{I}X':xEu^{2+}$, in which $M^{II}$ is at least one alkaline earth metal selected from the group consisting of Ba, Sr and Ca, $M^{I}$ is at least one alkali metal selected from the group consisting of Rb and Cs, X is at least one halogen selected from the group consisting of Cl, Br and I, X' is at least one halogen selected from the group consisting of F, Cl, Br and I, and "a" and "x" are numbers satisfying the conditions of $0\leq a\leq 4.0$ and $0 < x \leq 0.2$, respectively, as described in Japanese Patent Provisional Publication No. 60(1985)-101173; and $(Ba_{1-a},M^{II}_a)F(Br_{1-b},I_b) \cdot cNaX \cdot dCsX' \cdot eA : xEu^{2+}$, in which $M^{II}$ is at least one divalent metal selected from the group consisting of Sr and Ca, each of X and X' is at least one halogen selected from the group consisting of Cl, Br and I, A is at least one oxide selected from the group consisting of $Al_2O_3$, $SiO_2$ and $ZrO_2$, and "a", "b", "c", "d", "e" and "x" are numbers satisfying the conditions of $0 < a \leq 0.5$, $0 < b \leq 1$, $0 < c \leq 2$, $5 \times 10^{-5} \leq d \leq 5 \times 10^{-2}$, $5 \times 10^{-5} \leq e \leq 0.5$ and $0 < x \leq 0.2$, respectively, as described in Japanese Patent Provisional Publication No. 63(1988)-101478.

The coating dispersion comprising the binder and the above stimulable phosphor dispersed therein is prepared, and then applied evenly to the surface of the reflecting-material layer to form a layer of the coating dispersion. The coating procedure can be carried out by a conventional method such as a method of using a doctor blade, a roll coater or a knife coater. Then the coated layer of the dispersion is dried to form a stimulable phosphor layer on the reflecting-material layer. The thickness of the phosphor layer varies depending upon the characteristics of the aimed radiation image storage panel, the nature of the phosphor, the ratio between the binder and the phosphor, etc. Generally, the thickness of the phosphor layer is in the range of 20 μm to 1 mm, preferably in the range of 50 to 500 μm.

The phosphor layer can be provided on the reflecting-material layer by processes other than that given in the above. For example, the phosphor layer is initially prepared on a sheet (false support) such as a glass plate, metal plate or plastic sheet using the aforementioned coating dispersion and thus prepared phosphor layer is then overlaid on the reflecting-material layer by pressing or using an adhesive agent.

For the purpose of enhancing the sharpness of the obtained image, a colored intermediate layer may be provided between the reflecting-material layer and the stimulable phosphor layer.

Generally, a transparent protective film of plastic material is provided on a free surface of the stimulable phosphor layer of radiation image storage panel so as to protect the phosphor layer from physical and chemical deterioration. Such transparent protective film is preferably provided on the radiation image storage panel of the invention. The thickness of the film preferably is within a range of 3-20 μm.

As is described above, the stimulable phosphor layer of the radiation image storage panel of the invention may contain the white pigment (metal oxide which emits secondary X-rays of energy of 38-60 KeV) besides the stimulable phosphor. In this case, the ratio between the stimulable phosphor and the white pigment preferably is within a range of 100:1-100:20 (by weight). Further, a light reflecting layer for reflecting stimulating rays, may be independently provided on one surface of the stimulable phosphor layer containing the white pigment.

EXAMPLE 1

100 g of $Gd_2O_3$ fine particles (grain size of 90 wt.% of a particles was within 1–5 μm), 20.5 g of the binder (soft acrylic resin; the amount represents the solid content) and 4.5 g of phthalic acid ester were dispersed in methyl ethyl ketone by means of a propeller agitator, to prepare a coating dispersion (viscosity: 15 PS at 20° C.) for forming a reflecting-material layer. The prepared dispersion was evenly applied onto a polyethylene telephthalate sheet by means of a doctor blade, and the coated layer of the dispersion is dried to form a reflecting material layer (thickness: 30 μm) on the polyethylene telephthalate support.

Independently, 200 g of a stimulable phosphor ($BaFBr_{0.9}I_{0.1}:Eu^{2+}$, mean grain size: about 5 μm), 22.5 g of a binder (polyurethane: Desmolac 4125; available from Sumitomo Bayer Urethane Co., Ltd.; solid content: 40%) and 1.4 g of an anti-yellowing agent (epoxy resin: Epikote 1001; available from Yuka Shell Epoxy Co., Ltd.) were dispersed in methyl ethyl ketone, to prepare a coating dispersion (viscosity: 35 PS at 20° C.) for forming a stimulable phosphor layer. The prepared dispersion was evenly applied, by means of a doctor blade, onto a polyethylene terephthalate sheet (false support, thickness: 180 μm) having been beforehand coated with a silicon release agent. After drying, the coated film was peeled off to obtain a stimulable phosphor sheet (thickness: 230 μm).

The prepared stimulable phosphor sheet was laid on the above-prepared reflecting-material layer on the support to produce a composite. Then, the composition was passed between two rollers (both of which were heated to 70° C.) at a rate of 1 m/minute so that the composite might be compressed at a pressure of 500 kgw/cm². By this compression treatment, the phosphor sheet and the reflecting-material layer on the support were combined.

Thereafter, a polyethylene terephthalate film (thickness: 10 μm) was provided on the phosphor sheet with adhesive. Thus, a radiation image storage panel consisting essentially of a support, a reflecting-material layer, a stimulable phosphor layer, and a transparent protective film was prepared (Panel A-1).

Independently, the same procedure was repeated except for varying the thickness of the phosphor sheet to 260 μm to prepare another radiation image storage panel consisting essentially of a support, a reflecting-material layer, a stimulable phosphor layer and a transparent protective film (Panel A-2).

Further, the same procedure was repeated except for varying the thickness of the phosphor sheet to 290 μm to prepare a radiation image storage panel consisting essentially of a support, a reflecting-material layer, a stimulable phosphor layer, and a transparent protective film (Panel A-3).

COMPARISON EXAMPLE 1

The procedure of Example 1 was repeated except that the reflecting-material layer was prepared from 100 g of BaFBr fine particles (grain size of 90 wt.% of the particles was within a range of 1–5 μm), 20.5 g of the binder (soft acrylic resin; amount in terms of solid content) and 4.5 g of phthalic acid ester, to prepare a radiation image storage panel consisting essentially of a support, a reflecting-material (light-reflecting) layer, a stimulable phosphor layer, and a transparent protective film (Panel H-1).

Independently, the same procedure was repeated except for varying the thickness of the phosphor sheet to 250 μm to prepare another radiation image storage panel consisting essentially of a support, a reflecting-material layer, a stimulable phosphor layer, and a transparent protective film (Panel H-2).

Further, the same procedure was repeated except for varying the thickness of the phosphor sheet to 280 μm to prepare a radiation image storage panel consisting essentially of a support, a reflecting-material layer, a stimulable phosphor layer, and a transparent protective film (Panel H-3).

EXAMPLE 2

In the manner described in Example 1, a light-reflecting layer was formed on the support by using 100 g of BaFBr fine particles (grain size of 90 wt.% of the particles was within a range of 1–5 $\mu$m), 20.5 g of the binder (soft acrylic resin; amount in terms of solid content) and 4.5 g of phthalic acid ester.

Independently, 200 g of a stimulable phosphor (BaFBr$_{0.9}$I$_{0.1}$:Eu$^{2+}$, mean grain size: about 5 $\mu$m), 10 g of Gd$_2$O$_3$ fine particles (grain size of 90 wt.% of the particles was within a range of 1–5 $\mu$m), 22.5 g of a binder (polyurethane: Desmolac 4125; available from Sumitomo Bayer Urethane Co., Ltd.; solid content: 40%) and 1.4 g of an anti-yellowing agent (epoxy resin: Epikote 1001; available from Yuka Shell Epoxy Co., Ltd.) were dispersed in methyl ethyl ketone, to prepare a coating dispersion (viscosity: 35 PS at 20° C.) for forming a stimulable phosphor layer. The prepared dispersion was evenly applied, by means of a doctor blade, onto a polyethylene terephthalate sheet (false support, thickness: 180 $\mu$m) having been before-hand coated with a silicon release agent. After drying, the coated film was peeled off to obtain the stimulable phosphor sheet (thickness: 240 $\mu$m). The prepared stimulable phosphor sheet was laid on the above-prepared light-reflecting layer on the support, and then they were combined in the manner described Example 1.

After that, a polyethylene terephthalate film (thickness: 10 $\mu$m) was provided on the phosphor sheet with adhesive. Thus, a radiation image storage panel consisting essentially of a support, a light-reflecting layer, a stimulable phosphor layer containing reflecting material, and a transparent protective film was prepared (Panel B-1).

Independently, the same procedure was repeated except for varying the thickness of the phosphor sheet to 270 $\mu$m to prepare another radiation image storage panel consisting essentially of a support, a light-reflecting layer, a stimulable phosphor layer, and a transparent protective film (Panel B-2).

Further, the same procedure was repeated except for varying the thickness of the phosphor sheet to 295 $\mu$m to prepare a radiation image storage panel consisting essentially of a support, a light-reflecting layer, a stimulable phosphor layer, and a transparent protective film (Panel B-3).

EXAMPLE 3

The procedure of Example 2 was repeated except for varying the amount of Gd$_2$O$_3$ used for preparing the phosphor sheet to 20 g, to prepare a radiation image storage panel consisting essentially of a support, a light-reflecting layer, a stimulable phosphor layer containing reflecting material and a transparent protective film (Panel C-1).

Independently, the same procedure was repeated except for varying the thickness of the phosphor sheet to 260 $\mu$m to prepare another radiation image storage panel consisting essentially of a support, a light-reflecting layer, a stimulable phosphor layer, and a transparent protective film (Panel C-2).

Further, the same procedure was repeated except for varying the thickness of the phosphor sheet to 290 $\mu$m to prepare a radiation image storage panel consisting essentially of a support, a light-reflecting layer, a stimulable phosphor layer, and a transparent protective film (Panel C-3).

Evaluation of Radiation Image Storage Panel

Each of the radiation image storage panels of Examples 1–3 and Comparison Example 1 was measured on the luminance of stimulated emission (relative value) versus the sharpness (MTF value at the spacial frequency of 2 cycle/mm) on condition that the panel was exposed to X-rays at 80 KeV and then excited by the light of a He-Ne laser. The results are shown in FIG. 1.

According to the results shown in FIG. 1, the radiation image storage panel of the invention, which has the stimulable phosphor layer containing a particular white pigment such as gadolinium oxide or which has the reflecting-material layer comprising such pigment, is more sensitive, at the same sharpness level, than the known radiation image storage panel having a light-reflecting layer. This fact also means that the radiation image storage panel of the invention gives improved sharpness, as compared with the known radiation image storage panel having a light-reflecting layer at the same sensitivity level.

I claim:

1. A radiation image storage panel which has a stimulable phosphor layer containing stimulable divalent europium activated barium fluorohalide phosphor and a reflecting-material layer containing a white pigment, wherein said white pigment is a metal oxide which emits secondary X-rays having energy in the range of 38 to 60 KeV.

2. The radiation image storage panel as defined in claim 1, wherein said metal oxide is an oxide of at least one metal selected from the group consisting of Sm, Eu, Gd, Tb, Dy, Ho, Er, Tm, Yb, Lu, Hf, and Ta.

3. The radiation image storage panel as defined in claim 1, wherein mean grain size of said white pigment is smaller than that of particle of the phosphor.

4. A radiation image storage panel having a stimulable phosphor layer which contains both a stimulable divalent europium activated barium fluorohalide phosphor and a white metal oxide which emits secondary X-rays having energy in the range of 38 to 60 KeV.

5. The radiation image storage panel as defined in claim 4, wherein said metal oxide is an oxide of at least one metal selected from the group consisting of Sm, Eu, Gd, Tb, Dy, Ho, Er, Tm, Yb, Lu, Hf, and Ta.

6. The radiation image storage panel as defined in claim 4, wherein means grain size of said white metal oxide is smaller than that of particles of the phosphor.

* * * * *